(12) United States Patent
Hess

(10) Patent No.: US 7,022,167 B2
(45) Date of Patent: Apr. 4, 2006

(54) DESICCANT DEHUMIDIFIER HOSE CONNECTOR

(76) Inventor: Spencer W. Hess, 1961 Newark Ave., Whiting, NJ (US) 08759

( * ) Notice: Subject to any disclaimer, the term of this patent is extended or adjusted under 35 U.S.C. 154(b) by 134 days.

(21) Appl. No.: 10/683,215

(22) Filed: Oct. 14, 2003

(65) Prior Publication Data

US 2005/0076780 A1    Apr. 14, 2005

(51) Int. Cl.
  *B01D 53/26* (2006.01)
(52) U.S. Cl. .............. 96/108; 96/127; 96/130; 285/236; 285/252
(58) Field of Classification Search ........... 96/108, 96/123–128, 130, 147, 153, 154; 285/80, 285/197, 236, 252
See application file for complete search history.

(56) References Cited

U.S. PATENT DOCUMENTS

| | | | | |
|---|---|---|---|---|
| 2,511,497 A | * | 6/1950 | Dauphinee | 96/152 |
| 2,767,904 A | * | 10/1956 | Doyle | 417/423.2 |
| 2,867,833 A | * | 1/1959 | Duff | 15/323 |
| 3,570,222 A | * | 3/1971 | Dudek | 55/472 |
| 4,391,616 A | * | 7/1983 | Imamura | 95/92 |
| 4,497,361 A | * | 2/1985 | Hajicek | 96/125 |
| 5,029,907 A | * | 7/1991 | Gundy | 285/230 |
| 5,147,420 A | * | 9/1992 | Claesson | 95/113 |
| 5,160,811 A | * | 11/1992 | Ritzmann | 174/68.3 |
| 6,083,300 A | * | 7/2000 | McFadden | 95/113 |
| 6,149,699 A | * | 11/2000 | Grantham | 55/385.2 |
| 6,199,388 B1 | * | 3/2001 | Fischer, Jr. | 62/90 |
| 6,355,091 B1 | * | 3/2002 | Felber et al. | 95/10 |
| 6,364,942 B1 | * | 4/2002 | Felber et al. | 96/111 |
| 6,575,228 B1 | * | 6/2003 | Ragland et al. | 165/54 |
| 6,652,628 B1 | * | 11/2003 | Hess | 95/113 |
| 2004/0011197 A1 | * | 1/2004 | Wernholm et al. | 95/90 |

* cited by examiner

*Primary Examiner*—Robert H. Spitzer
(74) *Attorney, Agent, or Firm*—Charles I. Brodsky

(57) ABSTRACT

A raised ring encircling a duct at an output port of a desiccant dehumidifier housing prevents its flexible hose from blowing off the duct even when clamped, as dried air blowing pressures through the duct increase.

8 Claims, 2 Drawing Sheets

DESICCANT DEHUMIDIFIER HOSE CONNECTOR

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to the restoration industry, in general, and to the drying-out of water damaged buildings, in particular.

2. Description of the Related Art

As is known and understood, mobile desiccant dehumidifiers have begun to be employed more and more in recent years to dry water damaged buildings to reduce health problems caused by the incipient mold which develops. As is also known, silica gel is oftentimes employed as the desiccant in a wheel through which the moistened air is pulled from the walls, the flooring, the concrete, etc. into the dehumidifying chamber. As the silica gel, or other desiccant employed, absorbs the moisture, however, it becomes necessary to additionally heat the desiccant to liberate the moisture it collects; this, then, serves to optimize the operation in a continuous cycle—allowing the desiccant to continually absorb the moisture in the building and blowing dried air back in. Where large-scale desiccant equipment is employed, the heat energy required is often provided by electric heating or propane heating—but, in accordance with the teachings of my U.S. Pat. No. 6,652,628 (Ser. No. 10/190,035) firing the heat exchanger with diesel fuel offers many advantages.

As my patent describes, such desiccant dehumidifying apparatus draws moisturized air from a building through a heated desiccant within an enclosed housing and then blows dried air back into the building. Flexible hoses are oftentimes employed in this process, clamped about ducts at the input and output ports of the housing by such worm gear type clamps as tightened by screwdriver rotation in known manner. Because the drying of heavily water damaged buildings is usually an expensive procedure, it is not unusual for the dehumidifying apparatus to be operating day and night. But, it has often been noted that the flexible hose pumping the dried air back into the building blows off the duct, particularly as the blowing pressure increases. Not only is this an embarrassment to the service contractor, but it is counter-productive to the drying process, especially if the hose blows off when no one is around to reconnect it, and the dehumidifying effectively stops.

SUMMARY OF THE INVENTION

Continuing analysis of this problem led to an understanding that the fault followed from the manner by which the duct was fabricated. That is, the typical bead type ridge creased into the edge of the sheet metal duct when fabricated in the shop did not prevent the hose clamp from migrating over it and off the duct as the dried air blowing pressure increased to a threshold amount. This conventional duct ridge bead just wasn't enough, and the clamp and hose were blown off.

As will become clear from the following description, the substantially circular sheet metal duct at the output port of the housing is thus supplemented according to the invention by a raised ring encircling the duct, and of a construction to deter movement off the duct of the mechanical securing clamp which tightens the hose about the duct forwardly of the ring. In accordance with a preferred embodiment of the invention, this raised ring is made a permanent part of the duct, as by being welded to the sheet metal duct. The raised ring in this context may be constructed of aluminum, with the securing clamp being of appropriate type to maintain a thermoplastic type flexible hose in position. This raised ring encircling the duct at the output port of the desiccant dehumidifier apparatus provides the very significant advantage of preventing its flexible hose from being blown off the duct even when clamped, as the dried air blowing pressures increase.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
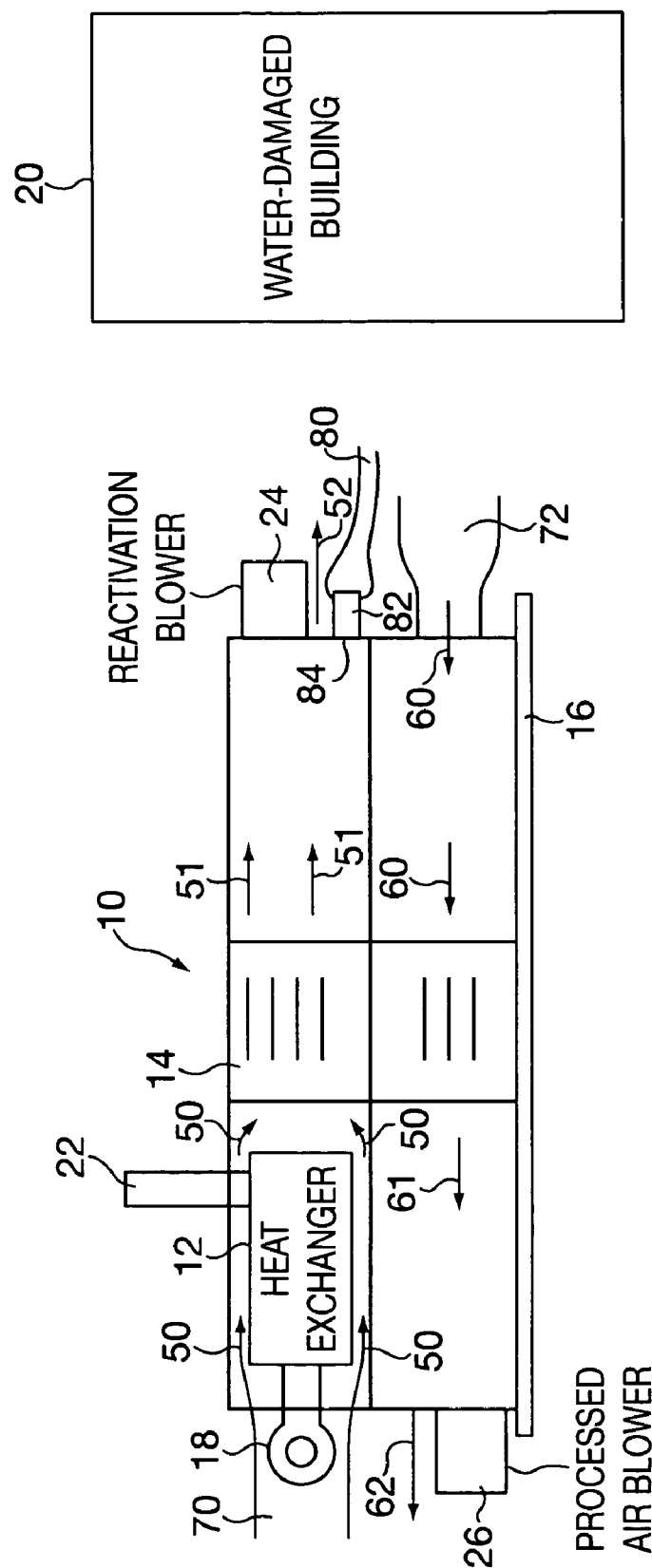
FIG. 1 is a block diagram helpful in an understanding of the apparatus and method for dehumidifying moisturized air present within a building from a point external thereto.

Referring to FIG. 1, the desiccant reactivation apparatus with which the present invention operates follows from the use of an enclosure 10 having a heat exchanger 12 and its method of operation both follow from the use of an enclosure 10 having a heat exchanger 12 and a desiccant 14. Reference numeral 20 identifies a building in which moisturized air is present and which is to dehumidified, with the enclosure 10 having a bottom surface 16 which may rest upon a trailer or truck bed adjacent the building 20 once driven to the work site. Alternatively, the enclosure 10 could be off-loaded from the trailer or truck bed onto the ground itself. Reference numeral 18 indicates a diesel fuel burner according to the invention in my afore-cited patent, having an exhaust gas stack 22. As will be understood, the diesel fuel burner 18 heats the exchanger 12 from the inside out—although any other type of burner to heat the exchanger 12 may be employed.

A first, or processed air, blower 26 draws the moisturized air from within the building through ductwork 72 and the desiccant 14 in a first direction (shown by the arrows 60), which traps the moisture therein before discharging the dried air out the enclosure 10 as shown by the arrows 61–62. A second, or reactivation, blower 24 draws ambient air from the surrounds via ductwork 70 into the enclosure 10, over and about the diesel fired heat exchanger 12 and through the desiccant 14 in a second direction, as illustrated by the arrows 50; the moisture liberated, heated air through the desiccant 14 is discharged outside the enclosure 10 as shown by the arrows 51–52. The heat exchanger 10 thus dehumidifies the desiccant 14 of the moisture collected from the wet building air in reactivating the desiccant 14 for continuing use. At the same time, the dried air from the enclosure 10 is blown or pumped along the arrows 51–52 back into the building 20. Typically, this is accomplished by a flexible hose shown as 80 coupled about a duct 82 at an output port 84 of the enclosure 10.

Figure 2:
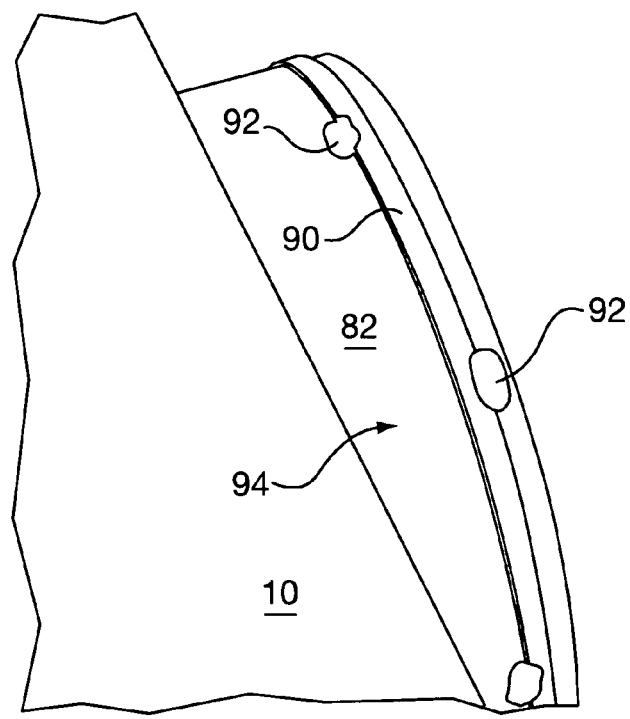
FIGS. 2–3 are illustrations helpful in an understanding of the hose connector according to a preferred construction of the present invention.
Figure 3:
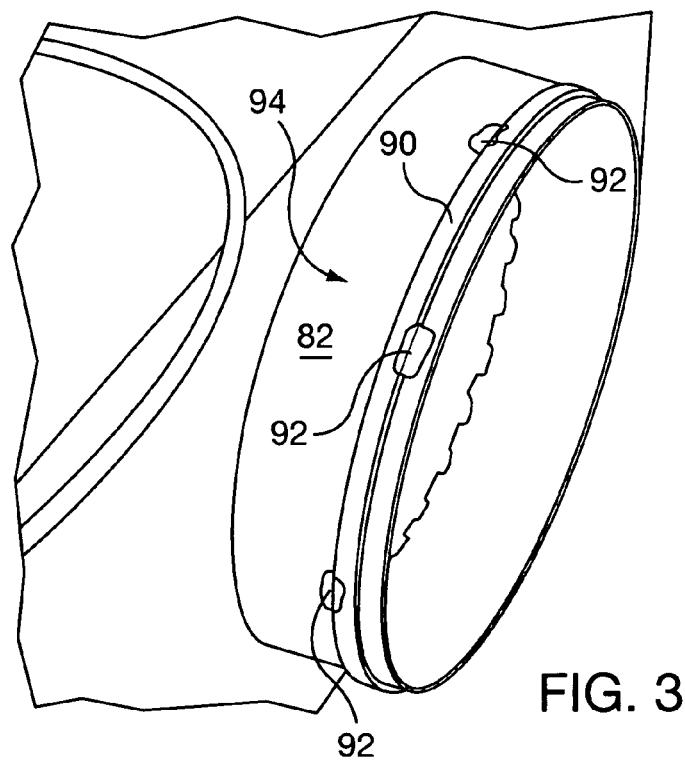

In accordance with the teachings of the present invention, as illustrated in FIGS. 2 and 3, raised ring 90 is utilized to encircle the duct 82, and made a permanent part of it as by welding at 92 when the duct 82 is fabricated of sheet metal and the raised ring 90 is constructed of aluminum. The flexible hose 80, which previously coupled about the duct 82, continues to overlie the duct 82, but additionally now overlies the raised ring 90 as well, and to be mechanically secured about the duct 82 forwardly of the ring, as at 94. Such mechanical means may continue to be a worm gear type of screw tightenable in understood manner—but one which is now deterred and prevented from blowing back off the duct 82 by the construction of the raised ring which acts as a block or stop. With the flexible hose 80 of a thermoplastic composition, and with almost any type of hose clamp being employable, the raised ring 90 merely needs to be constructed of a raised height, width and composition sufficient to withstand the rearward movement (if any) of the clamp brought about by the dried air blowing back through the output port 84 of the heat exchanger 10.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. In dehumidifying apparatus drawing moisturized air from a building through a heated desiccant within a housing, and by blowing dried air back, the improvement comprising, a substantially circular duct at an output port of said housing, a raised ring encircling said duct, a flexible hose overlying said ring and said duct to return said dried air into the building, and mechanical means for securing said hose about said duct forwardly of said raised ring.

2. The improvement of claim 1 wherein said raised ring is of construction to deter movement of said mechanical means off said duct as dried air blowing pressure increases.

3. The improvement of claim 1 wherein said mechanical means includes a worm gear clamp.

4. The improvement of claim 1 wherein said flexible hose is of thermoplastic composition.

5. The improvement of claim 2 wherein said raised ring is a permanent part of said duct.

6. The improvement of claim 2 wherein said duct is fabricated of sheet metal.

7. The improvement of claim 6 wherein said raised ring is welded to said duct.

8. The improvement of claim 7 wherein said raised ring is constructed of aluminum.

* * * * *